United States Patent [19]

Breslow

[11] 4,116,449
[45] Sep. 26, 1978

[54] AMUSEMENT DEVICE

[75] Inventor: Jeffrey D. Breslow, Highland Park, Ill.

[73] Assignee: Marvin Glass & Associates, Chicago, Ill.

[21] Appl. No.: 824,350

[22] Filed: Aug. 15, 1977

[51] Int. Cl.² .............................................. A63F 3/00
[52] U.S. Cl. ................................. 273/240; 273/142 R
[58] Field of Search ................ 273/240, 141 R, 142 R

[56]  References Cited
U.S. PATENT DOCUMENTS

| 1,754,738 | 4/1930 | Calle | 273/240 |
| 2,280,609 | 4/1942 | Williamson | 273/240 |
| 3,851,885 | 12/1974 | Pepkowski et al. | 273/148 R X |

FOREIGN PATENT DOCUMENTS 916,914  1/1963  United Kingdom ..................... 273/240

Primary Examiner—Anton O. Oechsle
Attorney, Agent, or Firm—Mason, Kolehmainen, Rathburn & Wyss

[57] ABSTRACT

An amusement device for several players useful in art education comprises a game board having a playing surface decorated with a plurality of identified, spaced apart, dots arranged in a grid system and a plurality of pictorial symbols which are adapted to be roughly represented by straight lines drawn between selected pairs of said dots in accordance with instructions on program cards corresponding to each of the pictorial symbols represented. A transparent acetate sheet is covered over the playing surface of the game board so that the lines drawn thereon with marker means such as a grease pencil may be erased when a drawing is completed and a new drawing is to be started. Chance means is provided for selecting the starting sequence that the lines are to be drawn in accordance with the program cards, each of which represents one of the symbols on the game board. As each line is drawn in sequence the players may guess as to what the lines being drawn will eventually depict in the way of a particular symbol on the game board, and space is provided for recording of the guesses and players names in sequence.

6 Claims, 4 Drawing Figures

U.S. Patent     Sept. 26, 1978     4,116,449
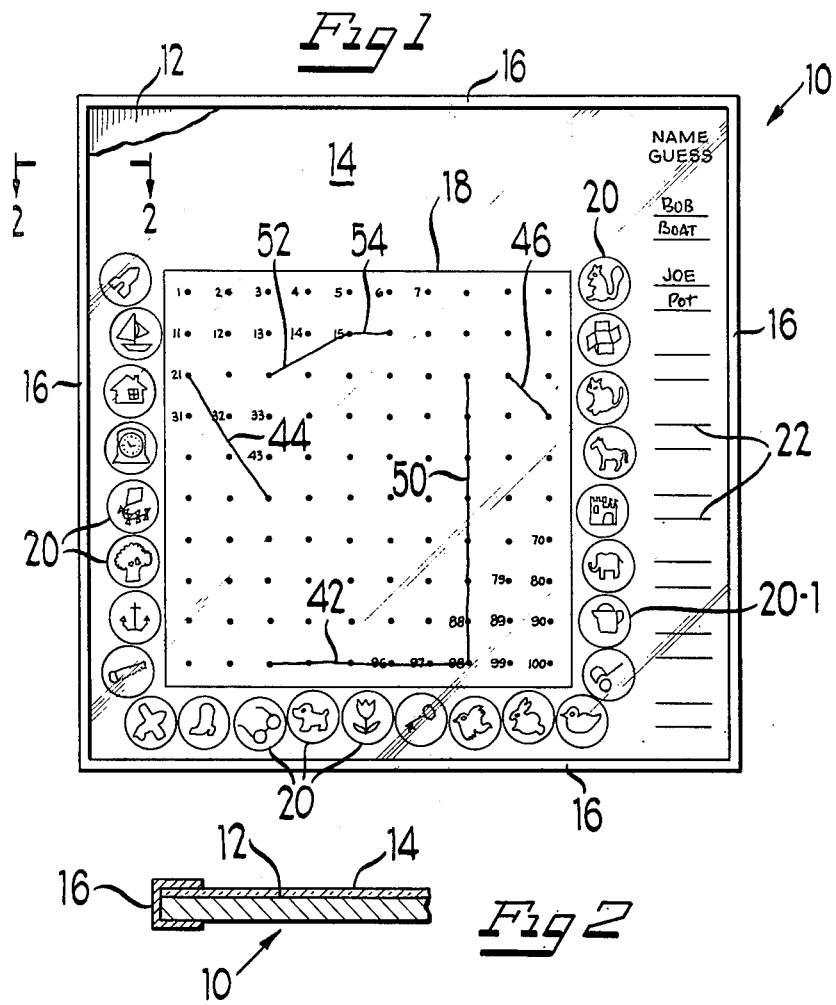
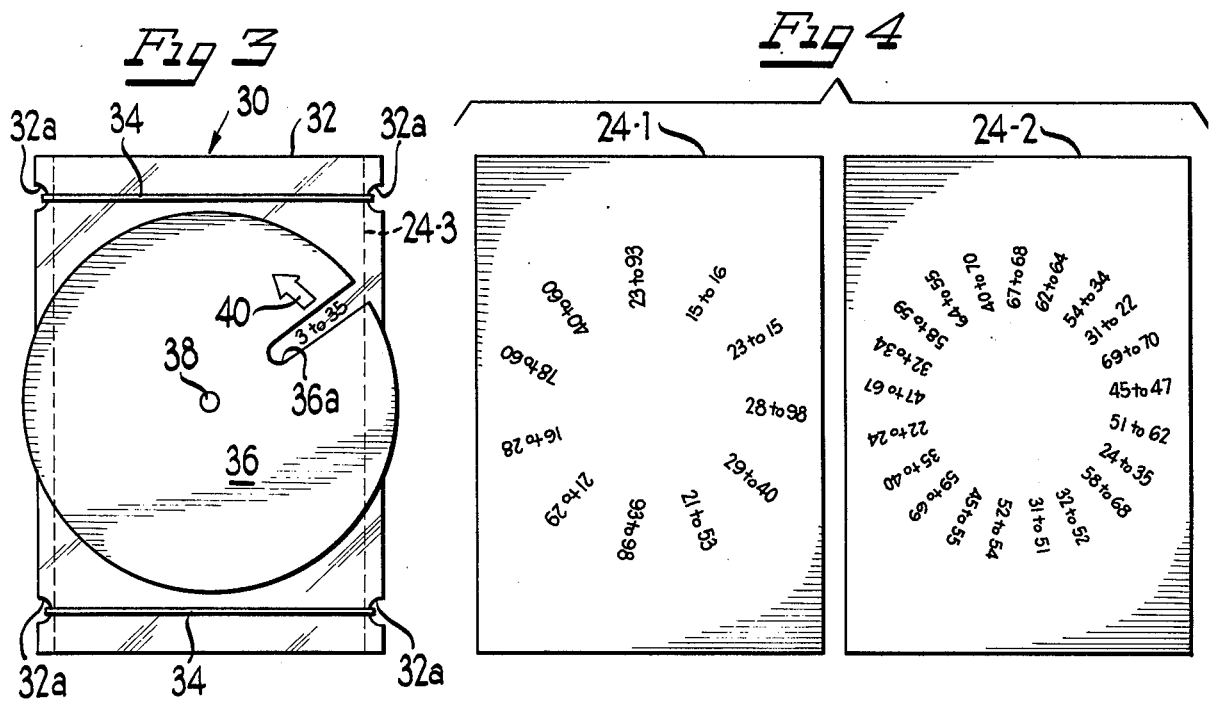

AMUSEMENT DEVICE

BACKGROUND OF THE INVENTION

1. Field of the Invention

The present invention relates to an amusement device for several players and is useful in art education. More particularly, the invention is directed toward an art education amusement device which is used in a competitive game for several players and thus greatly enhances learning and interest of the players in artistic endeavors. The amusement game is particularly well suited for aiding in the art education of young children and provides a means for stimulating and holding the interest of the players.

2. Description of the Prior Art

Many blackboard type drawing devices have been provided for young children wherein erasable drawings are produced by means of a marker on a clear acetate sheet backed up by a darkened somewhat resilient board member which sticks to the flexible acetate on pressure contact. After a picture is made, it is readily erased by pulling up on the acetate sheet and separating the contact between the darkened backing member and the underside of the sheet. These devices may be used by children to produce a variety of erasable pictures, figures, letters and the like.

The present invention is directed toward a new and improved amusement device for several players and used in a game environment wherein the players are directed to produce a straight line diagram or picture by drawing in sequence on a line by line basis as set forth by a program card. The line diagram drawn comprises a rough representation of a particular object or symbol shown on the game board and during the line by line sequence of the game, the players may enter guesses as to which one of the pictorial symbols on the game board that the drawing being produced will represent. The player first guessing the correct symbol is the winner of the game and a chance device is provided for randomly selecting the initial line of a drawing that is to be completed.

It is an object of the present invention to provide a new and improved amusement game for several players which is helpful in art education.

Still another object of the present invention is to provide a new and improved art education amusement game which requires both mental and physical skills on the part of the players and provides a competitive environment with respect thereto.

Another object of the invention is to provide an amusement device which helps players to mentally visualize pictorial images as they are being produced in successive, step by step, lines formed in a pre-programmed sequence.

SUMMARY OF THE INVENTION

The foregoing and other objects and advantages of the present invention are accomplished in a new and improved art education amusement device or game for several players comprising a game board having a playing surface with a plurality of identified, spaced apart, dots arranged in a grid system. A plurality of pictorial symbols are provided on the game board and these are adapted to be roughly represented by straight lines drawn between selected pairs of dots in accordance with pre-programmed instructions on a program card. A deck of cards is provided with a card corresponding to each of the symbols pictured on the game board. A transparent sheet of acetate or the like is provided over the surface of the game board for displaying lines which are drawn by the players with marker means such as a grease pencil or crayon. The lines are in sequence between the selected pairs of dots as directed by a program card for each symbol represented on the game board. A chance device is provided for selecting the the initial or starting line that is made and additional lines follow in the programmed sequence to form a straight line drawing or image representing a pictorial symbol on the game board. Space is provided on the playing surface for the recordation of the guesses and names of the players guessing as to which of the pictorial symbols on the board will ultimately be shown when the line by line drawing in progress is completed. After all of the instructions on a program card are completed, the drawing produced will closely represent a corresponding pictorial symbol and the drawing is then erased and the process is repeated with other program cards.

BRIEF DESCRIPTION OF THE DRAWINGS

For a better understanding of the invention, reference should be had to the following detailed description taken in conjunction with the drawings, in which:

FIG. 1 illustrates the playing surface of a game board constructed in accordance with the features of the present invention;

FIG. 2 is a fragmentary cross-section of the game board taken substantially along lines 2—2 of FIG. 1;

FIG. 3 is a plan view of a chance device used in connection with a program card in accordance with the present invention; and FIG. 4 is an illustration showing the faces of a pair of program cards in accordance with the present invention.

DESCRIPTION OF THE PREFERRED EMBODIMENT

Referring now more particularly to the drawings, therein is illustrated a new and improved art education amusement device or game for several players and particularly adapted for use by children as an aid in learning to draw. The invention is particularly well adapted for teaching children to recognize the essential or main lines of interest in a pictorial symbol. In accordance with the invention, there is provided a game board 10 having a relatively large planar upper surface 12 (FIG. 2) over which is provided a clear sheet of acetate 14. The sheet 14 is adapted to have lines drawn thereon with a marker such as a grease pencil or crayon and these lines may then be rubbed off with a rag or erased. The acetate sheet is secured in place over the upper playing surface 12 of the game board by means of a peripheral edge flange 16 which extends around the entire periphery of the game board 10. The playing surface 12 is decorated with a relatively large square 18 having a plurality of numbered, dots which are spaced apart in rows and columns as illustrated to form a grid system. For example, the dots in the upper row from left to right are numbered 1 through 10 and an equal number of rows and columns are provided so that the dot at the lower right hand corner of the grid is identified by the number 100. It is to be understood that different numbers of rows and/or columns could be provided in the grid system to provide more or less detail in the straight line drawings that are made on the grid.

Around the perimeter of the grid system on the opposite sides and bottom there are provided a plurality of pictorial representations or symbols, each of which is contained in a circle 20 as illustrated. The pictorial representations are directed toward well known objects, including animals, birds, flowers and the like and these pictorial symbols are shown in some detail to more or less accurately portray the object that is defined. On the right hand side, the playing surface of the board is provided with a column of spaced apart lines 22 and the column is headed with the title "Name Guess" so that as the players guess which of the pictorial symbols in the circles 20 are being drawn in the grid enclosure 18 their names and their choices are written down in succession on the respective lines.

In accordance with the present invention, for each of the pictorial symbols in a circle 20 on the game board playing surface 12 there is provided a separate program card 24-1, 24-2, etc. As illustrated in FIG. 4, each program card has a playing face with pre-programmed instructions thereon for directing a player to draw a line between a pair of numbered grid points or dots in the grid enclosure square 18. These instructions are arranged on radians around a central point of the card. For example, the program card 24-1 illustrated in FIG. 4, contains instructions for drawing eleven different lines on the grid system. Each line instruction is printed on a radian extending outwardly from the center of the program card and is angularly spaced from the line instructions on either side. Nowhere on the face of a program card is there provided an indication of which of the pictorial symbols on the game board that the particular program card pertains or corresponds to. When all of the lines are completed between grid points in accordance with the line drawing instructions on a particular program card, a straight line drawing will result and this drawing will represent one of the pictorial symbols on the game board to which the particular program card pertains or corresponds.

In order to determine on a random basis which of the several line instructions on a card will initially be followed to start a new line drawing, there is provided a chance device illustrated in FIG. 3 and referred to generally by the numeral 30. The chance device 30 includes a generally rectangular transparent base 32 preferably formed of plastic material or the like and provided with notches 32a on opposite sides adjacent the upper and lower ends. These notches accommodate rubber bands 34 which are used to removably hold the base in overlying position on a program card 24-1, 24-2, 24-3, etc. that is randomly chosen. As illustrated in FIG. 3, the chance device 30 is being utilized in connection with a program card 24-3 and the card is secured in place, centered beneath the base 32 by the rubber bands 34 which extend around opposite side edges of the program card. The chance device includes a circular spinner 36 mounted on the center of the base sheet 32 by a rivet 38 or other suitable axle means so that the spinner 36 may be manually rotated with the finger to spin freely. The body of the spinner 36 is opaque and is provided with a single, radially extending slot or opening running inwardly from the outer circumference of the circular spinner. The slot is adapted to expose the line instructions on a card one at a time. As illustrated in FIG. 3, the exposed line instruction, indicates that a line is to be drawn from grid dot 3 to grid dot 35. After the spinner 36 is used to randomly determine and initiate the starting point in the sequence of lines to be drawn, the spinner thereafter is advanced in a counterclockwise direction as indicated by the arrow 40 one line at a time until all of the line drawing instructions on a card have been completed or until one of the players in the game correctly guesses which of the pictorial symbols on the game board is being produced by the sequence of straight lines from point to point being applied to the grid system in accordance with the instructions on a program card.

Referring to FIGS. 1 and 4, the partially drawn picture represented on the grid system 18 of the game board 10, pertains to the program card 24-1 and as indicated, this drawing was started with a line drawn in accordance with the particular line instruction on a lower radian directing that a line be drawn from grid dot 93 to dot 98. Following this initial line (indicated by the reference numeral 42 in FIG. 1) the spinner 36 was rotated counterclockwise step by step until the next line drawing instruction appears in the index window 36a. A line from grid dot 21 to dot 53 appears next as line 44 on FIG. 1. Any time during the sequence of adding additional lines to the drawing being produced on the grid, a player may guess what they think the ultimate pictorial representation being produced will be. For example, as indicated, a first player Bob guessed that the drawing being made would be a "boat". Continuing on with the program card 24-1, a line from grid dot 29 to dot 40 indicated as line 46 on FIG. 1 is next drawn, and following that, a line from grid dot 28 to dot 98 indicated as line 50 on FIG. 1 is then drawn. With these four lines drawn, a player for example, Joe, has recorded his correct guess that the drawing being produced on the game board is a "pot". The process is continued with the drawing of lines 52 and 54 in accordance with the instructions on the program card 24-1 and may be terminated at any time during the sequence on the game board, if all of the players agree to the symbol being produced. However, it is desirable to finish all of the line drawing instructions on a program card to complete the pictorial representation and thereby positively ensure that there is no mistake between the point to point, straight-line drawing produced and a symbol in a circle 20 on the game board. Following all of the point to point line drawing instructions on the program card 24-1 around to the starting instruction clearly indicates that the line drawing when completed will represent the "watering can" or "pot" as shown in the circle 20-1 on the game board.

It should also be noted that each program card in the deck corresponds or pertains to only one pictorial symbol within a circle 20 on the game board, but the chance device 30 provides for a random pick of the starting point for any drawing. Thus, the game is extremely interesting to children of tender years and aids in teaching them to look for the essential or primary lines in a particular object or pictorial symbol thereof. This of course, helps in the cultivation of art skills in children. The game can be played by a single player but preferably provides amusement and faster learning in a competitive game environment including two or more players.

Although the present invention has been described with reference to a single illustrated embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. An amusement device useful in art education comprising:
    a game board having a playing surface with a plurality of identified, spaced apart, dots arranged in a grid system thereon, and a plurality of symbols thereon adapted to be roughly represented by lines drawn between selected ones of said dots in accordance with a program card corresponding to each of said symbols;
    a transparent sheet over said playing surface for removably displaying lines drawn with marker means running between selected dots as directed sequentially by a program card; and
    chance means for selecting the sequence of lines to be drawn from a program card representing one of said symbols.

2. The amusement device of claim 1 wherein said program cards include sequentially arranged instruction for drawing lines between selected dots.

3. The amusement device of claim 2 wherein said instructions are arranged on radians around a central point and said chance means includes a rotating spinner adapted to overlie said instructions on a program card and having a radial slot adapted to reveal one of said instructions at a time.

4. The amusement device of claim 3 wherein said spinner is mounted for manual spinning action about an axis on a transparent overlay adapted to be removably secured to said program cards.

5. The amusement device of claim 4 wherein said spin axis is aligned with said central point on said program cards.

6. The amusement device of claim 4 including elongated resilient looped bands for holding said transparent overlay in position on a program card.

* * * * *